(12) United States Patent
Kim (10) Patent No.: US 7,259,810 B2
(45) Date of Patent: Aug. 21, 2007

(54) BACKLIGHT ASSEMBLY HAVING PARTICULAR LAMP AND REFLECTING PLATE ARRANGEMENT AND DIRECT LIGHTING TYPE LIQUID CRYSTAL DISPLAY APPARATUS

(75) Inventor: Yong-Il Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 63 days.

(21) Appl. No.: 10/404,806

(22) Filed: Apr. 1, 2003

(65) Prior Publication Data

US 2003/0234896 A1 Dec. 25, 2003

(30) Foreign Application Priority Data

Jun. 22, 2002 (KR) .............................. 2002-35132

(51) Int. Cl.
*G02F 1/1335* (2006.01)
*F21V 5/00* (2006.01)

(52) U.S. Cl. .............................. 349/67; 349/61; 349/64; 362/328; 362/330

(58) Field of Classification Search .................. 349/58, 349/64, 67, 70, 61; 362/31, 613
See application file for complete search history.

(56) References Cited

U.S. PATENT DOCUMENTS 4,242,725 A 12/1980 Douma et al.
5,648,827 A * 7/1997 Shaw ........................... 349/61
5,659,376 A * 8/1997 Uehara et al. ................. 349/58
5,971,567 A * 10/1999 Van Duijneveldt .......... 362/296
6,249,328 B1 * 6/2001 Fukuzawa et al. ............ 349/70
6,269,565 B1 * 8/2001 Inbar et al. .................... 40/361
6,407,781 B2 * 6/2002 Kitada .......................... 349/58
6,654,088 B2 * 11/2003 Morishita et al. ........... 349/113
2002/0018341 A1 * 2/2002 Torihara et al. ............... 362/31

FOREIGN PATENT DOCUMENTS

| JP | 06273761 | 9/1994 |
| JP | 08179318 | 7/1996 |
| JP | 08201803 | 8/1996 |
| JP | 11311781 | 11/1999 |

\* cited by examiner

*Primary Examiner*—Andrew Schechter
*Assistant Examiner*—Michael H. Caley
(74) *Attorney, Agent, or Firm*—Cantor Colburn LLP (57) ABSTRACT

A direct lighting type LCD apparatus includes lamps for generating a first light, a diffusing member for diffusing the first light and light reflected from a reflecting member to emit a second light having uniform brightness distribution, and a receiving member for receiving the lamps, the diffusing member and the reflecting member for reflecting the first light to the diffusing member. The lamps are arranged in the receiving member to be separated from the diffusing member at selected distances, respectively, which may be different from one another. The direct lighting type LCD apparatus may have brightness distribution which is controlled by varying the distances between the respective lamps and the diffusing member to improve quality of image display.

19 Claims, 11 Drawing Sheets

BACKLIGHT ASSEMBLY HAVING PARTICULAR LAMP AND REFLECTING PLATE ARRANGEMENT AND DIRECT LIGHTING TYPE LIQUID CRYSTAL DISPLAY APPARATUS

BACKGROUND OF THE INVENTION

1. Field of the Invention

The present invention relates to a backlight assembly and a direct lighting type LCD (Liquid Crystal Display) apparatus, and more particularly to a backlight assembly for improving display quality by partially controlling brightness and a direct lighting type LCD apparatus employing the backlight assembly of the present invention.

2. Description of the Related Art

Information processing devices have been developed for improvements on their shapes, functions, and high data processing speed. In such information processing devices, information is processed in the form of electrical signals to be displayed on a display device such as an LCD apparatus.

LCD apparatuses generally have a lighter weight and a smaller size as compared with CRT (Cathode Ray Tube) type display devices, and have been developed to achieve full-color and high-resolution functions. In the LCD apparatuses, an arrangement of liquid crystal molecules is changed into a specific arrangement by applying a voltage to the liquid crystal molecules. The LCD apparatuses convert variations in optical properties of liquid crystal cells into variations in visual properties, thereby displaying images on an LCD apparatus. Generally, an LCD apparatus receives light from a backlight assembly disposed under an LCD panel and displays images on the LCD panel.

Backlight assemblies may be classified into those for direct lighting type LCD apparatuses and those for edge type LCD apparatuses based on the position of light sources. In a direct lighting type LCD apparatus, light is provided to an LCD panel from a plurality of light sources disposed under the LCD panel, so that the direct lighting type LCD apparatuses may provide higher brightness of images compared with the edge type LCD apparatuses.

Figure 1:
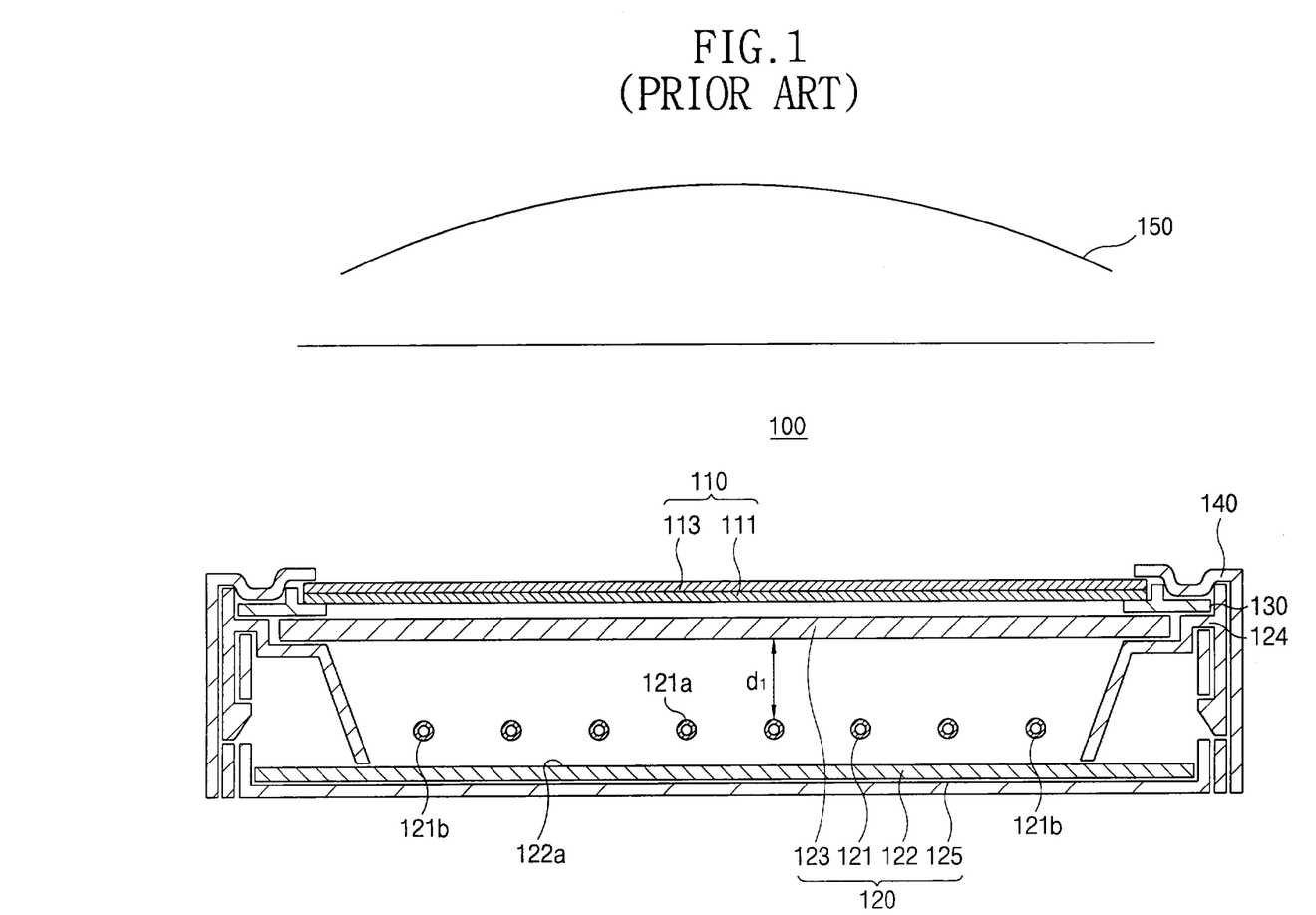
FIG. 1 is a cross-sectional view showing a structure of a conventional direct lighting type LCD apparatus.

FIG. 1 is a cross-sectional view showing a structure of a conventional direct lighting type LCD apparatus.

Referring to FIG. 1, the direct lighting type LCD apparatus 100 includes an LCD panel 110 for displaying an image and a backlight assembly 120 for supplying light to the LCD panel 110.

The backlight assembly 120 includes a plurality of lamps 121 for generating a first light, a diffusing plate 123 for diffusing the first light and generating a second light having uniform brightness distribution, and a lamp reflecting plate 122 for reflecting the first light to the diffusing plate 123. The lamps 121, lamp reflecting plate 122 and diffusing plate 123 are received in a receiving container.

The receiving container includes a bottom mold frame 124 and a bottom chassis 125 combined to each other using a hook. The bottom mold frame 124 has a quadrangle shape, and sidewalls of the bottom mold frame 124 are parallel to the longitudinal direction of the lamps 121 and inclined at a predetermined angle. The sidewalls of the bottom mold frame 124 are each provided with a step on which an edge portion of the diffusing plate 123 is placed. The bottom chassis 125 has a rectangular parallelepiped shape, and an upper surface of the bottom chassis 125 is open to provide a receiving space. The lamp reflecting plate 122 is received in the receiving space and the lamps 121 are disposed on the lamp reflecting plate 122.

A portion of the first light emitted from the lamps 121 is incident on the diffusing plate 123, and the remaining portion of the first light is reflected from the lamp reflecting plate 122 and supplied to the diffusing plate 123. As a result, the diffusing plate 123 emits the second light after diffusing the light directly from the lamps 121 and the reflected right from the lamp reflecting plate 122.

The direct lighting type LCD apparatus further includes an upper mold frame 130 disposed on the diffusing plate 123. The LCD panel 110 is disposed on the upper mold frame 130. A top chassis 140 is combined to the bottom chassis 125 to secure the LCD panel 110.

As shown in FIG. 1, the lamp reflecting plate 122 has a flat plate shape and the lamps 121 are disposed proximately on the lamp reflecting plate 122. When those of the lamps 121 disposed at the central area of the lamp reflecting plate 122 are referred as first lamps 121a and those of the lamps 121 disposed at the end portions of the lamp reflecting plate 122 are referred as second lamps 121b, the first lamps 121a are each disposed between two adjacent lamps and the second lamps 121b are each disposed adjacent to only one lamp. As a result, the brightness at the end portions of the LCD panel 110 is lower than that at the central portion of the LCD panel 110 as a brightness distribution curve 150 shows in FIG. 1.

Accordingly, the direct lighting type LCD apparatus 100 has brightness distribution which is not uniform over the entire screen thereof, so that display quality of the direct lighting type LCD apparatus 100 is deteriorated.

Also, a vertical distance between the respective lamps 121 and the diffusion plate 123 has an identical distance d1, so that the brightness distribution of the direct lighting type LCD apparatus 100 may not be partially controlled.

BRIEF SUMMARY OF THE INVENTION

The present invention provides a backlight assembly for improving display properties by partially controlling brightness.

The present invention also provides a direct lighting type LCD apparatus having the backlight assembly.

In one aspect of the invention, there is provided a backlight assembly comprising: a plurality of lamps for generating a first light; a diffusing member for diffusing the first light from the lamps; and a receiving member for receiving the lamps and the diffusing member and for reflecting the first light to the diffusing member. The diffusing member diffuses the first light and the reflected light to emit a second light having uniform brightness distribution, and the lamps are arranged in the receiving member such that a distance between one lamp and the diffusing member is different from another distance between another lamp and the diffusing member.

In another aspect, there is provided an LCD apparatus comprising: a plurality of lamps for generating a first light; a diffusing member for diffusing the first light and the light reflected from a lamp reflecting plate to emit a second light having uniform brightness distribution; a receiving member for receiving the lamps, the diffusing member and the reflecting member, in which the lamps are arranged in the receiving member such that a distance between one lamp and the diffusing member is different from another distance between another lamp and the diffusing member; an LCD panel for receiving the second light and displaying images in response to the second light by use of liquid crystal; and a top chassis combined to the receiving member to secure the LCD panel onto the receiving member.

The lamp reflecting plate may include a bottom surface and sidewalls, which are inclined at various angles, respectively, with respect to the diffusing member, and the lamps are disposed proximate the bottom surface of the lamp reflecting plate. Thus, distances between the respective lamps and the diffusing member are different from one another according to installation positions of the lamps. Accordingly, the direct lighting type LCD apparatus advantageously have brightness distribution, which is uniform over the entire screen thereof.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 2:
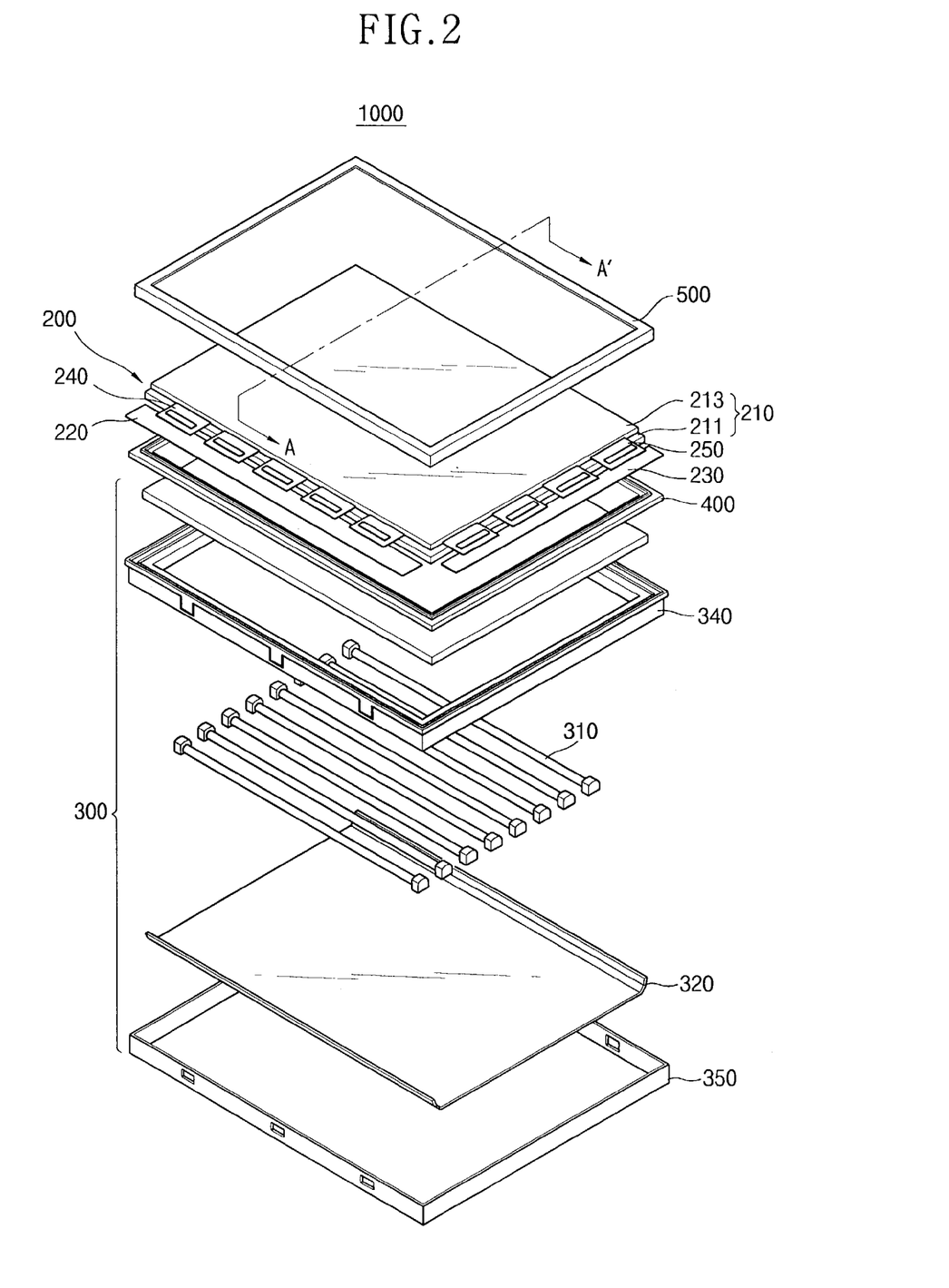
FIG. 2 is an exploded perspective view showing a direct lighting type LCD apparatus according to an exemplary embodiment of the present invention.
Figure 3:
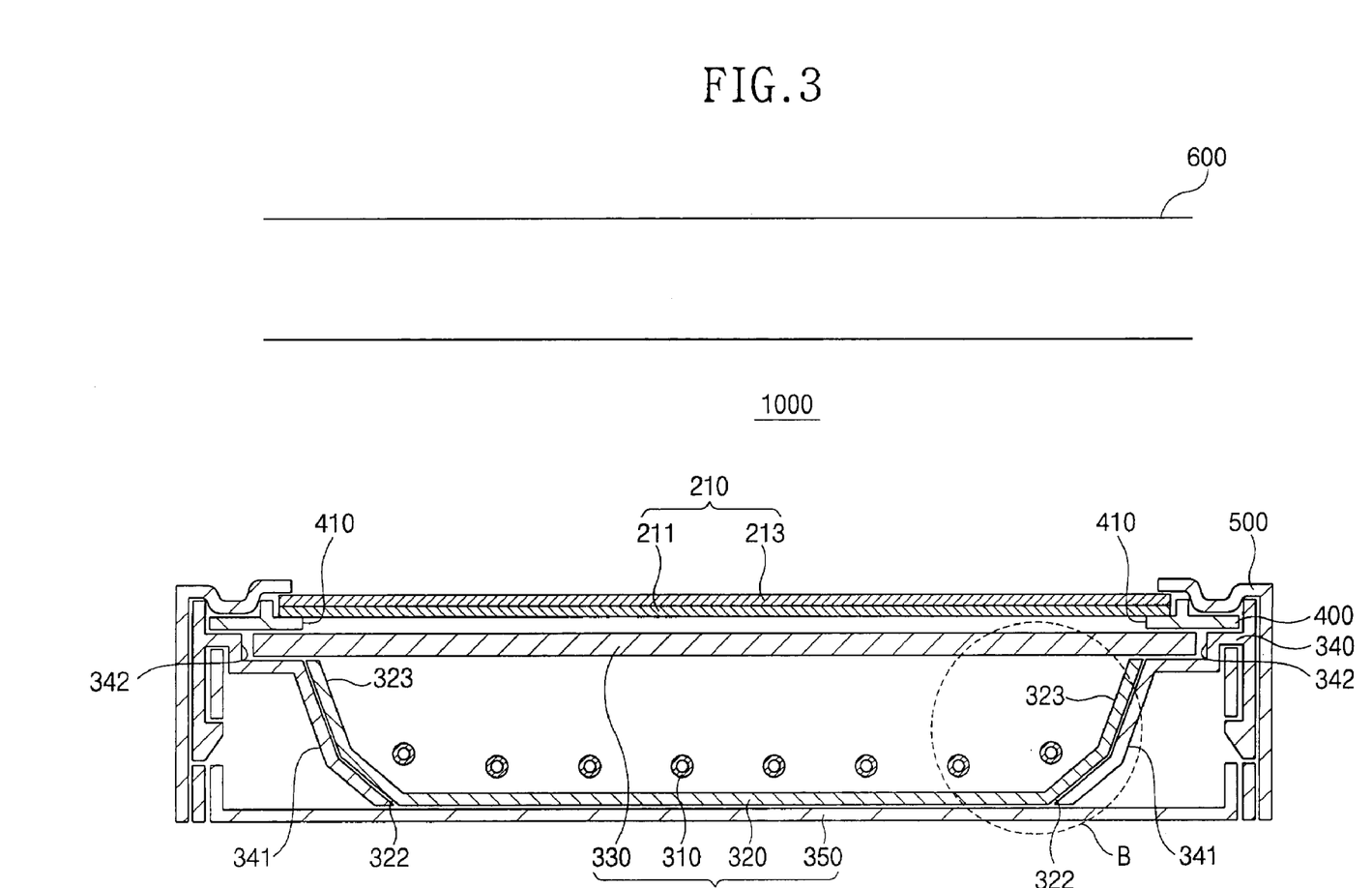
FIG. 3 is a cross-sectional view taken along the line A–A' for showing a structure of the direct lighting type LCD shown in FIG. 2.
Figure 4:
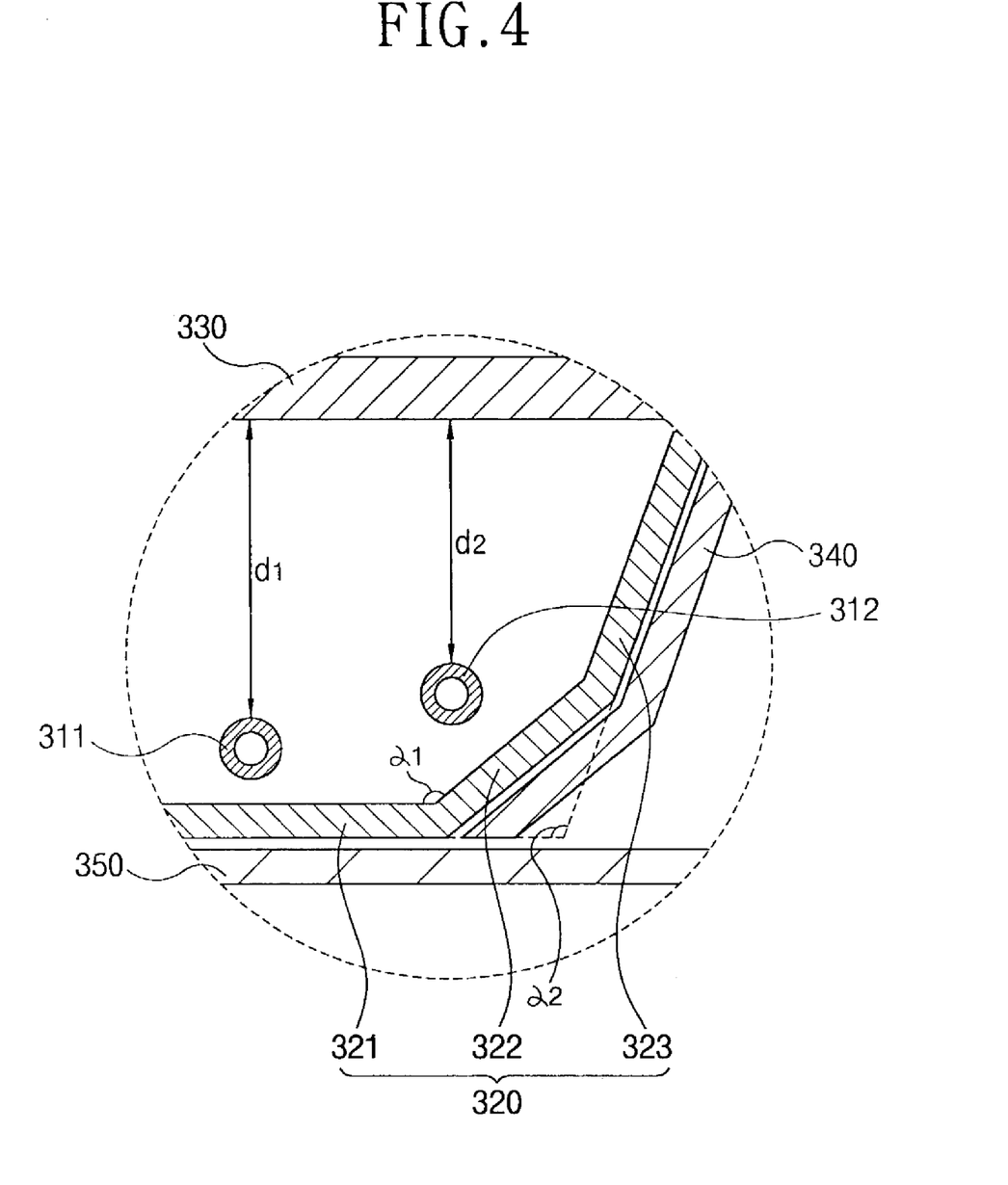
FIG. 4 is an enlarged cross-sectional view of portion 'B' in FIG. 3.

FIG. 2 is an exploded perspective view showing a direct lighting type LCD apparatus according to an exemplary embodiment of the present invention. FIG. 3 is a cross-sectional view taken along the line A–A' for showing a structure of the direct lighting type LCD shown in FIG. 2. FIG. 4 is an enlarged cross-sectional view of portion 'B' in FIG. 3.

Referring to FIGS. 2 and 3, the direct lighting LCD apparatus 1000 includes an LCD panel assembly 200 for displaying images and a backlight assembly 300 for supplying light to the LCD panel assembly 200. The LCD panel assembly 200 includes an LCD panel 210, a data PCB (Printed Circuit Board) 220, a gate PCB 230, a data TCP (Tape Carrier Package) 240 and a gate TCP 250.

The LCD panel 210 includes a TFT (Thin Film Transistor) substrate 211, a color filter substrate 213 facing the TFT substrate 211, and liquid crystal (not shown) interposed between the TFT substrate 211 and the color filter substrate 213.

The TFT substrate 211 is, for example, a transparent glass substrate on which TFTs are disposed in a matrix configuration. Each of the TFTs includes a source terminal connected to a data line, a gate terminal connected to a gate line, and a drain terminal having a pixel electrode made of, for example, ITO (Indium Tin Oxide) which is transparent conductive material.

The color filter substrate 213 is disposed facing the TFT substrate 211. RGB pixels, which are color pixels for emitting predetermined colors when light passes therethrough, are formed on the color filter substrate 213 through a thin film process. A common electrode is disposed on the entire surface of the color filter substrate 213. The common electrode may be made of ITO.

The data lines disposed on the LCD panel 210 are electrically connected to the data PCB 220 through the data TCP 240, and the gate lines are electrically connected to the gate PCB 230 through the gate TCP 250. Responsive to externally applied electrical signals, the data and gate PCBs 220 and 230 supply a driving signal for controlling an operation of the LCD panel assembly 200 and a timing signal for controlling the operation timing of the LCD panel assembly 200 to the gate and data lines through the data and gate TCPs 240 and 250, respectively.

The backlight assembly 300 includes a plurality of lamps 310 for generating a first light, a diffusing plate 330 for emitting a second light after diffusing the first light provided directly from the lamps 310 and the light reflected from a lamp reflecting plate 320, and a receiving member for receiving the lamps 310 and the diffusing plate 330. The receiving member also includes the lamp reflecting plate 320, a bottom mold frame 340 and a bottom chassis 350.

FIGS. 2 and 3 show the direct lighting type LCD apparatus having eight lamps as an exemplary embodiment, however a different embodiment of the present invention may have different number of lamps.

The bottom mold frame 340 is combined to the bottom chassis 350 using a hook structure and the lamp reflecting plate 320 is disposed on the bottom mold frame 340. The bottom mold frame 340 has a quadrangle shape, and sidewalls 341 of the bottom mold frame 340 are parallel to the longitudinal direction of the lamps 310 and inclined at a predetermined angle. The sidewalls 341 of the bottom mold frame 340 are each provided with a step on which the edges of the diffusing plate 330 are each placed.

The bottom chassis 350 includes a bottom surface and sidewalls extended from the bottom surface. The bottom chassis 350 has a rectangular parallelepiped shape and an upper surface of the bottom chassis 350 is open to provide a receiving space. The lamp reflecting plate 320 is received in the receiving space and the lamps 310 are disposed proximately on the lamp reflecting plate 320.

The lamp reflecting plate 320 includes a first inclination surface 322 and a second inclination surface 323, which are extended along the sidewalls 341 of the bottom mold frame 340. The sidewalls 341 of the bottom mold frame 340 have an inclination shape corresponding to that of the first and second inclination surfaces 322 and 323.

Although not shown in FIGS. 2 and 3, the bottom mold frame 340 further includes fixing portions (not shown) disposed on other sidewalls integrally connected to the sidewalls 341 thereof. The fixing portions are separated from each other at a distance corresponding to that between the lamps 310. The fixing portions are coupled to the opposite end portions of the lamps 310, respectively, to fix the lamps 310 onto the bottom mold frame 340.

A portion of the first light emitted from the lamps 310 is incident on the diffusing plate 330, and the remaining portion of the first light is reflected from the lamp reflecting plate 320 and supplied to the diffusing plate 330. The diffusing plate 330 emits the second light after diffusing the first light directly from the lamps 310 and the reflected light from the lamp reflecting plate 320.

As shown in FIG. 4, the lamp reflecting plate 320 includes a flat surface 321 parallel to the diffusing plate 330, the first inclination surface 322 extended from the flat surface 321 and inclined at a first angle $\alpha 1$ with respect to the flat surface 321, and the second inclination surface 323 extended from the first inclination surface 322 and inclined at a second angle $\alpha 2$ with respect to the flat surface 321.

The lamps 310 are disposed proximately on the flat surface 321 and the first inclination surface 322. When those of the lamps 310 disposed proximate the flat surface 321 of the lamp reflecting plate 320 are referred as first lamps 311 and those disposed proximate the first inclination surface 322 of the lamp reflecting plate 320 are referred as second lamps 312, a vertical distance d1 between the first lamp 311 and the diffusing plate 330 is greater than a vertical distance d2 between the second lamp 312 and the diffusing plate 330. Since the second lamps 312 are disposed more proximate the diffusing plate 330 than the first lamps 311 are, the amount of the first light supplied to end portions of the diffusing plate 330 increases.

The first and second angles $\alpha 1$ and $\alpha 2$ may be different from each other. For example, the second angle $\alpha 2$ is less than the first angle $\alpha 1$, so that the first light from the second lamps 312 disposed proximate the first inclination surface 322 may be effectively supplied to the diffusing plate 330. The first angle $\alpha 1$ is more than 0 degree and less than 180 degrees and the second angle $\alpha 2$ is more than 0 degree and less than the first angle $\alpha 1$.

The direct lighting type LCD apparatus 1000 may increase the brightness at the end portions of the diffusing plate 330 by disposing the second lamps 312 more proximate the diffusing plate 330 compared with the first lamps 311 disposed on the flat surface 321 of the lamp reflecting plate 320. Accordingly, the direct lighting type LCD apparatus 1000 has brightness distribution, which is uniform over the entire screen thereof as a brightness distribution curve 600 shows in FIG. 3. The first and second lamps 311 and 312 each have an identical distance from the lamp reflecting plate 320.

Referring to FIGS. 2 and 3, an upper mold frame 400 is disposed on the receiving member in which the lamps 310 and the diffusing plate 330 are received. The upper mold frame 400 has four sidewalls connected to each other and a supporting portion 410 protruded from the four sidewalls. The upper mold frame 400 presses down the diffusing plate 330 toward the bottom mold frame 340 to secure the diffusing plate 330 onto the bottom mold frame 340. The LCD panel 210 is disposed on the supporting portion 410 of the upper mold frame 400.

The direct lighting type LCD apparatus 1000 further includes a top chassis 500 having a clamp shape. The upper and bottom surfaces of the top chassis 500 are open. The top chassis 500 is disposed on the LCD panel 210 and combined to the bottom chassis 350 so as to secure the LCD panel 210 onto the bottom chassis 350. The top chassis 500 maybe combined to the bottom chassis 350 using a hook structure.

Figure 5:
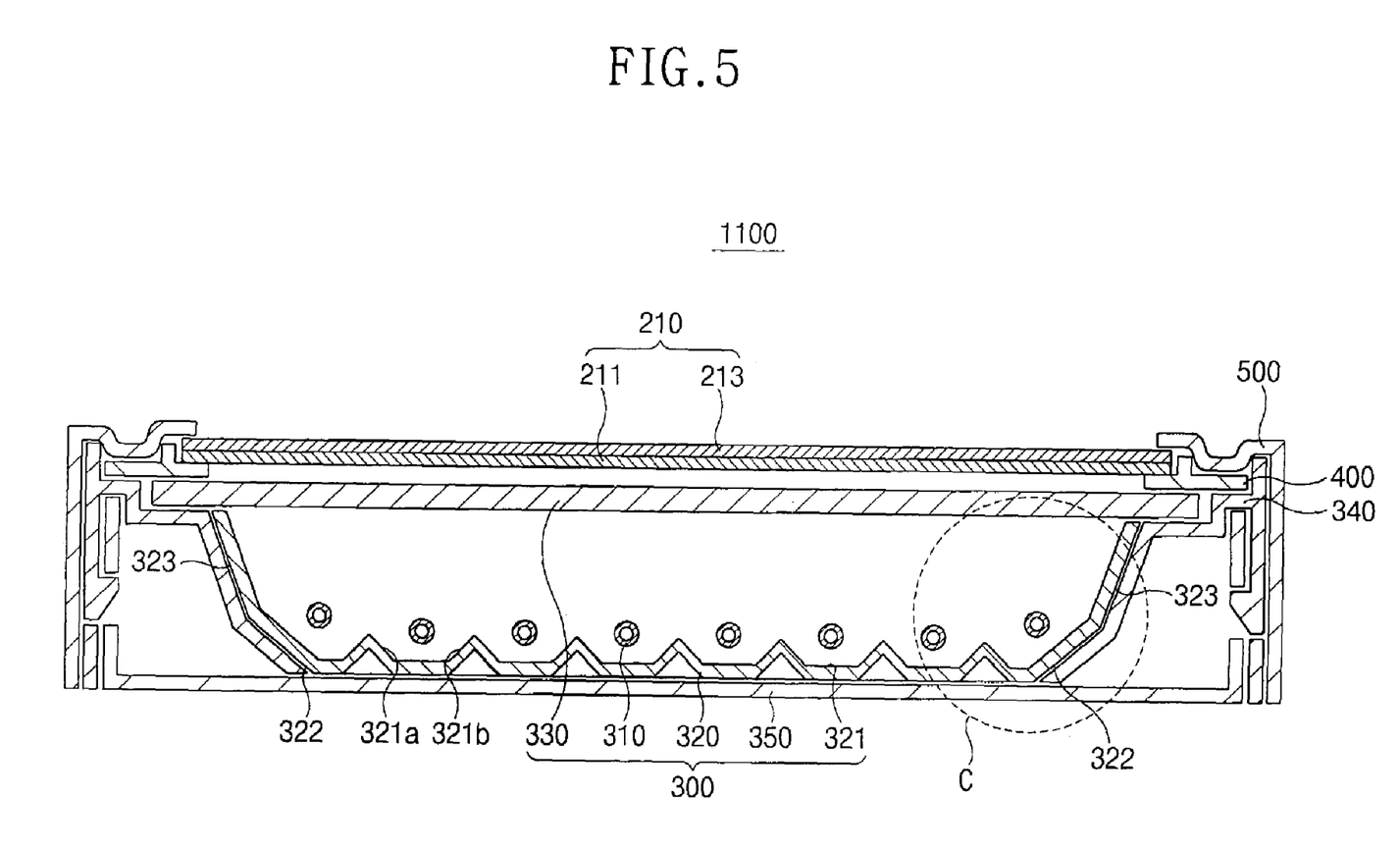
FIG. 5 is a cross-sectional view showing a structure of a direct lighting type LCD apparatus according to another embodiment of the present invention.
Figure 6:
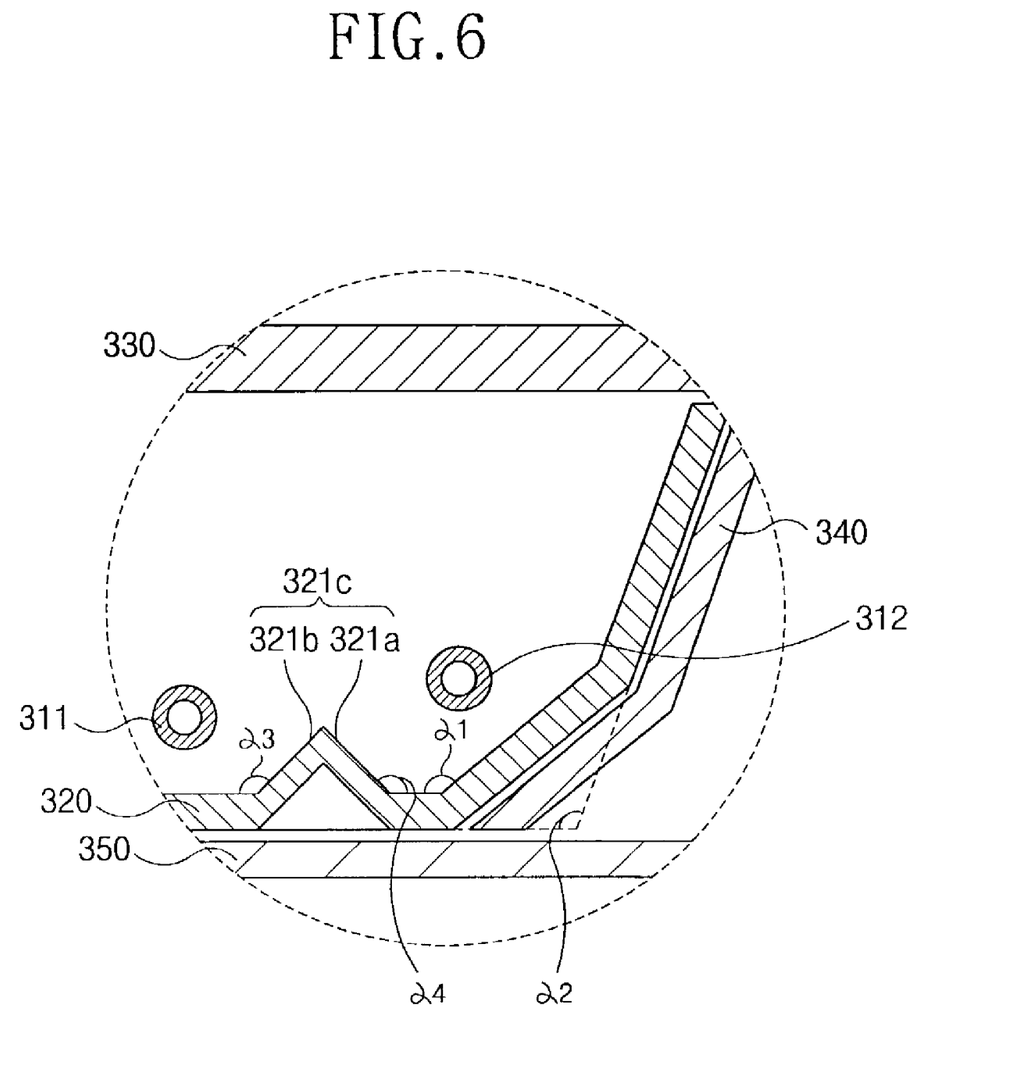
FIG. 6 is an enlarged cross-sectional view of portion 'C' in FIG. 5.

FIG. 5 is a cross-sectional view showing a structure of a direct lighting type LCD apparatus according to another embodiment of the present invention, and FIG. 6 is an enlarged cross-sectional view of portion 'C' in FIG. 5.

Referring to FIGS. 5 and 6, the backlight assembly 300 according to another embodiment includes a plurality of lamps 310, a diffusing plate 330 and a receiving member. The lamps 310 and diffusing plate 330 are received in the receiving member. The receiving member includes a lamp reflecting plate 320, a bottom mold frame 340 and a bottom chassis 350.

In FIG. 5, the direct lighting type LCD apparatus has eight lamps as an exemplary embodiment, however the number of lamps in a backlight assembly is not limited to eight but may vary in different embodiments.

The lamp reflecting plate 320 includes a flat surface 321, a first inclination surface 322 extended from the flat surface 321 and inclined at a first angle $\alpha 1$ with respect to the flat surface 321, and a second inclination surface 323 extended from the first inclination surface 322 and inclined at a second angle $\alpha 2$ with respect to the flat surface 321. The flat surface 321 is provided with protrusion portions 321c such that each of the lamps 310 is placed between adjacent protrusion portions 321c. One protrusion portion 321c includes a third inclination surface 321a inclined at a third angle $\alpha 3$ with respect to the flat surface 321 and a fourth inclination surface 321b inclined at a fourth angle $\alpha 4$ with respect to the flat surface 321. The third and fourth inclination surfaces 321a and 321b are in contact with each other to provide a pitch.

The protrusion portions 321c compensate brightness at the area between adjacent lamps 310 by rendering the light from the lamps 310 reflected from the third and fourth inclination surfaces 321a and 321b. Further, by forming the protrusion portions 321c on the lamp reflecting plate 320, a receiving space is provided between each protrusion portion 321c and the bottom chassis 350. A return wire (not shown) connected between the opposite end portions of each lamp 310 is received in the receiving space. Thus, an assembling efficiency of the direct lighting type LCD apparatus 1000 increases.

Figure 7:
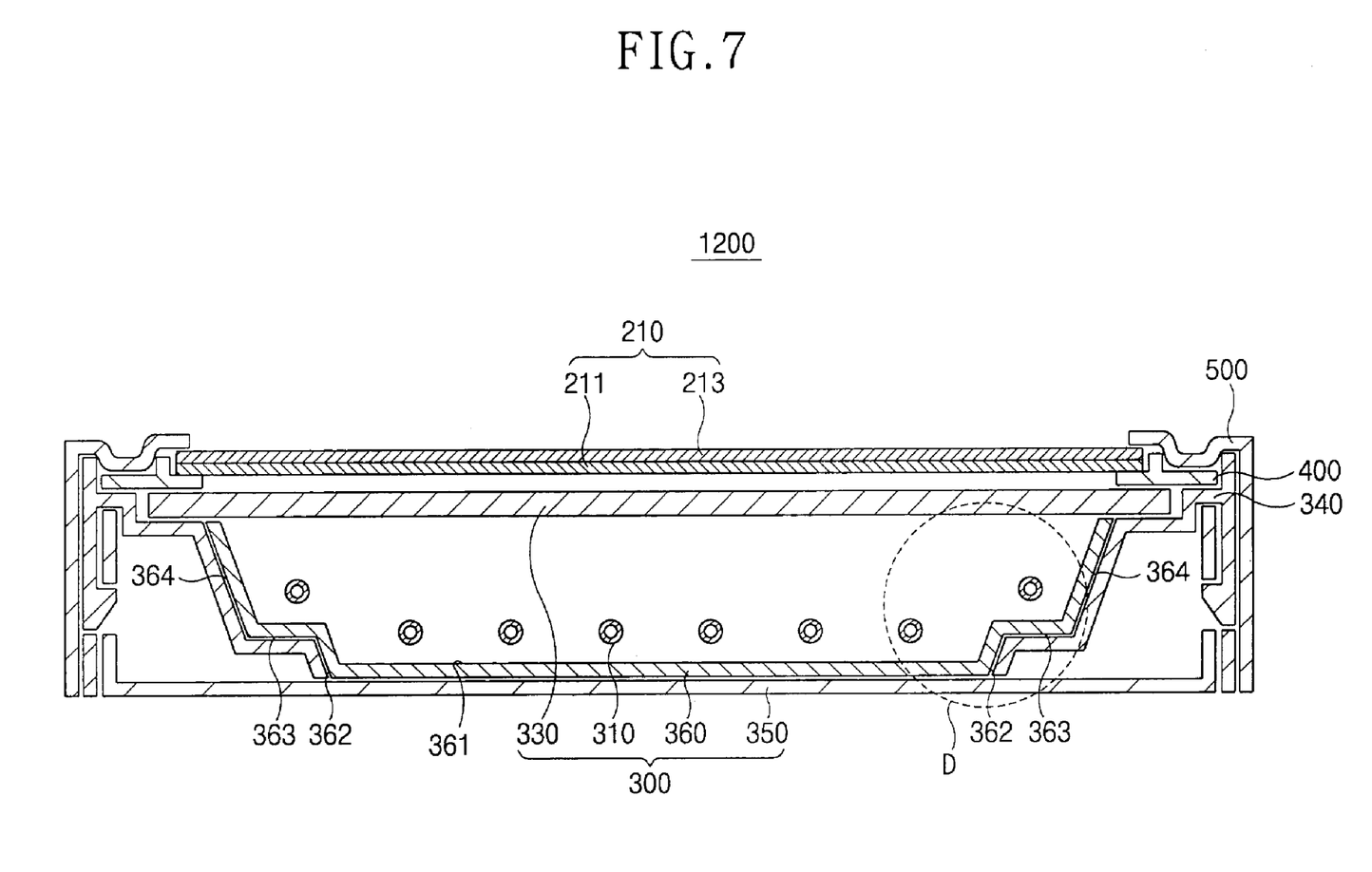
FIG. 7 is a cross-sectional view showing a structure of a direct lighting type LCD apparatus according to another embodiment of the present invention.
Figure 8:
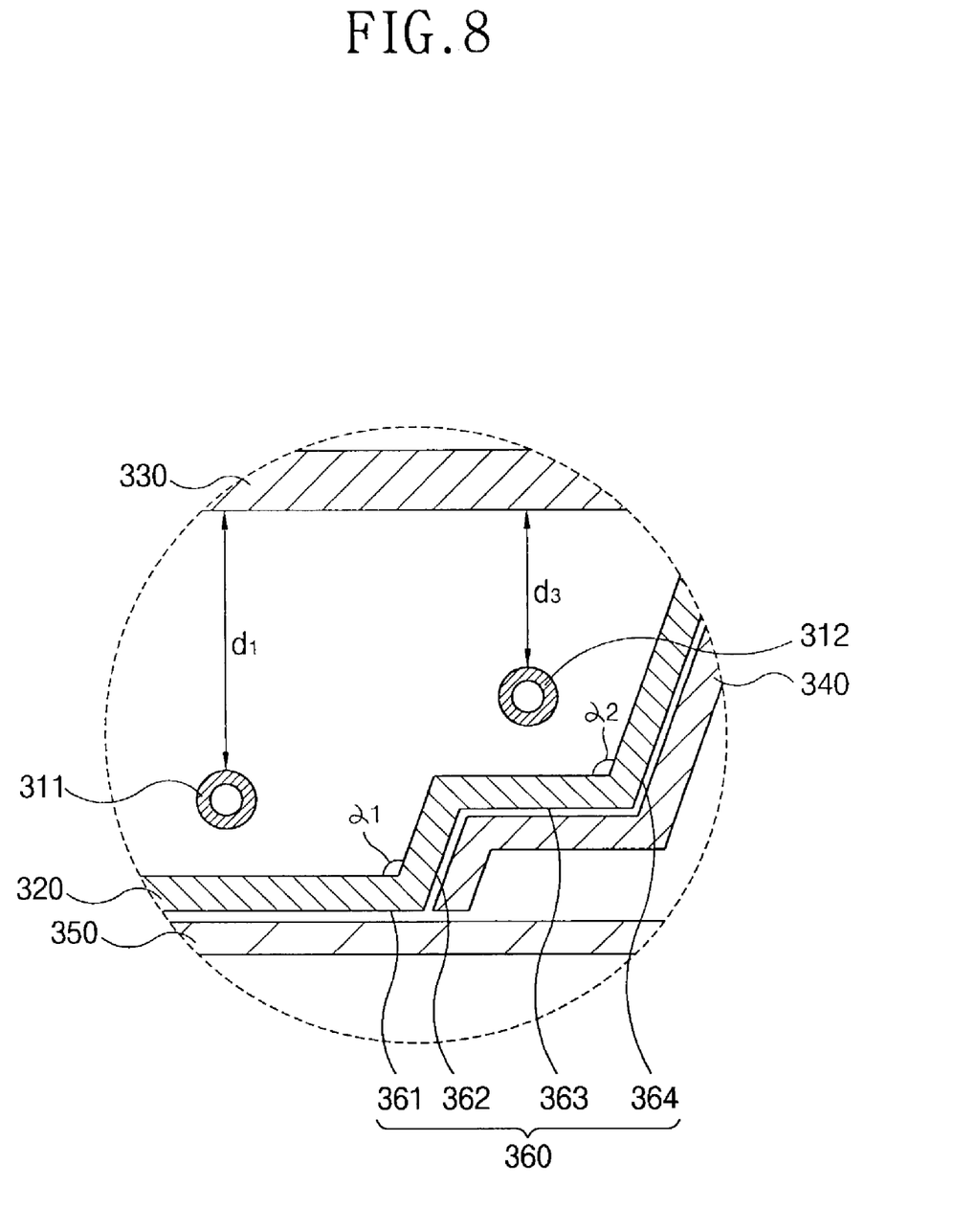
FIG. 8 is an enlarged cross-sectional view of portion 'D' in FIG. 7.

FIG. 7 is a cross-sectional view showing a structure of a direct lighting type LCD apparatus according to another embodiment of the present invention, and FIG. 8 is an enlarged cross-sectional view of portion 'D' in FIG. 7.

Referring to FIGS. 7 and 8, the direct lighting LCD apparatus 1200 includes an LCD panel 210 for displaying images and a backlight assembly 300 for supplying light to the LCD panel 210.

The backlight assembly 300 includes a plurality of lamps 310 for generating a first light, a diffusing plate 330 for diffusing the first light and light reflected from a lamp reflecting plate 360 to emit a second light, and a receiving member. The lamps 310 and the diffusing plate 330 are received in the receiving member. The receiving member also includes the lamp reflecting plate 360, a bottom mold frame 340 and a bottom chassis 350.

In FIGS. 7 and 8, the direct lighting type LCD apparatus has eight lamps as an exemplary embodiment, however the number of lamps may vary in different embodiments.

The lamp reflecting plate 360 includes a first flat surface 361 parallel to the diffusing plate 330, a first inclination surface 362 extended from the first flat surface 361 and inclined at a first angle $\alpha 1$ with respect to the first flat surface 361, a second flat surface 363 extended from the first inclination surface 362 and parallel to the first flat surface 361, and a second inclination surface 364 extended from the second flat surface 363 and inclined at a second angle $\alpha 2$ with respect to the second flat surface 363. For example, the first and second angles $\alpha 1$ and $\alpha 2$ may be the same or substantially identical. The first and second angles α1 and α2 are more than 0 degree and less than 180 degrees.

The lamps 310 are disposed proximately on the first and second flat surfaces 361 and 363. Those of the lamps 310 disposed proximate the first flat surface 361 of the lamp reflecting plate 360 are referred as first lamps 311, and those disposed proximate the second flat surface 363 of the lamp reflecting plate 360 are referred as second lamps 312. A vertical distance d1 between each first lamp 311 and the diffusing plate 330 is greater than a vertical distance d3 between each second lamp 312 and the diffusing plate 330. Since the second lamps 312 are disposed more proximate the diffusing plate 330 than the first lamps 311 are, the irradiation distance of the light from the second lamp 312 is shorter than that of the light from the first lamp 311. Thus, the amount of the first light supplied to end portions of the diffusing plate 330 increases. Accordingly, the direct lighting type LCD apparatus 1100 provides brightness distribution which is uniform over the entire screen thereof.

As shown in FIG. 7, sidewalls of the bottom mold frame 340 each have inclination surfaces and flat surfaces corresponding to those of the lamp reflecting plate 360. Although not shown in FIGS. 7 and 8, the bottom mold frame 340 further includes fixing portions (not shown) disposed on other sidewalls integrally connected to the sidewalls shown in FIGS. 7 and 8. The fixing portions are separated from each other at the same distance as that of the corresponding lamps 310. The fixing portions are coupled to the opposite end portions of the lamps 310 to fix the lamps 310 to the bottom mold frame 340, respectively.

Figure 9:
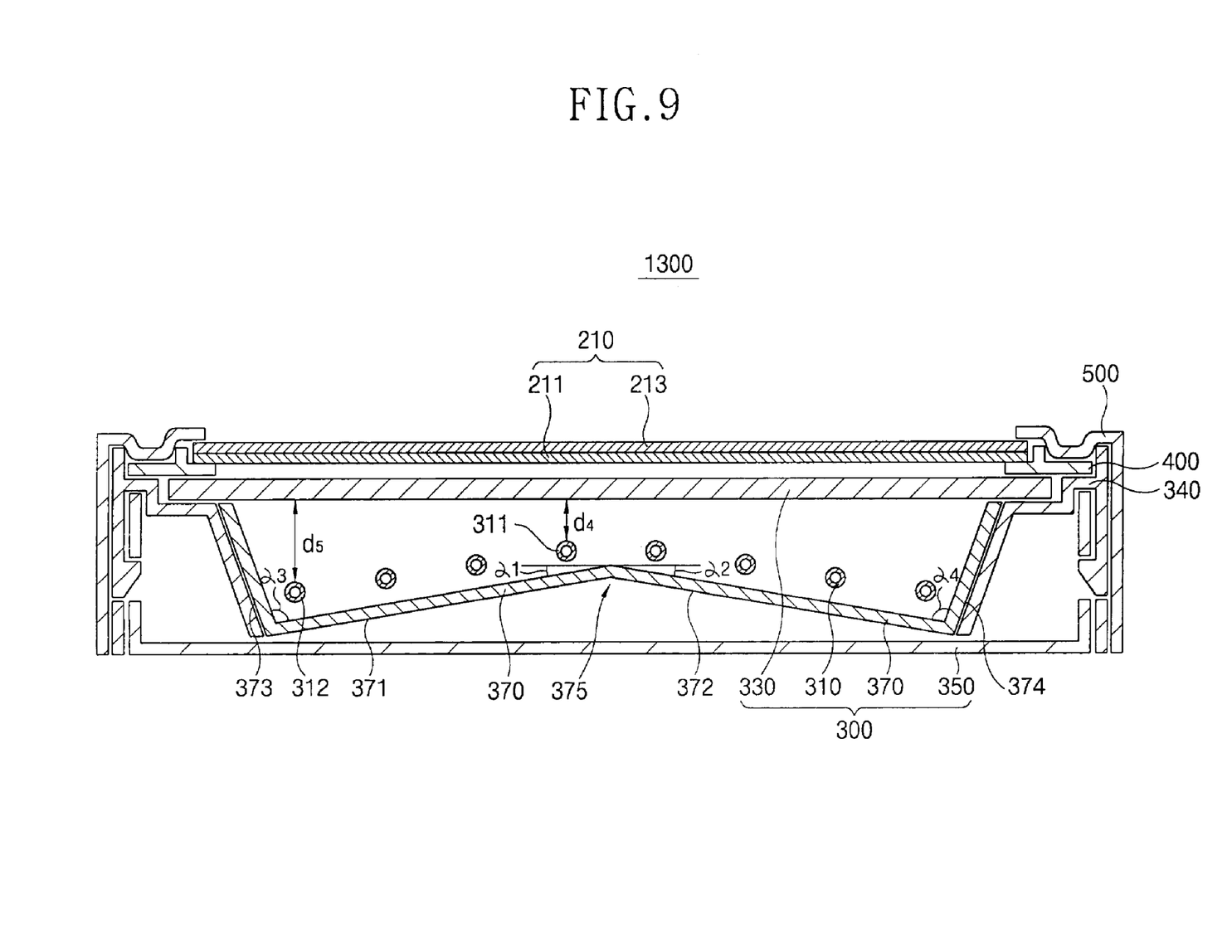
FIG. 9 is a cross-sectional view showing a structure of a direct lighting type LCD apparatus according to another embodiment of the present invention.
Figure 10:
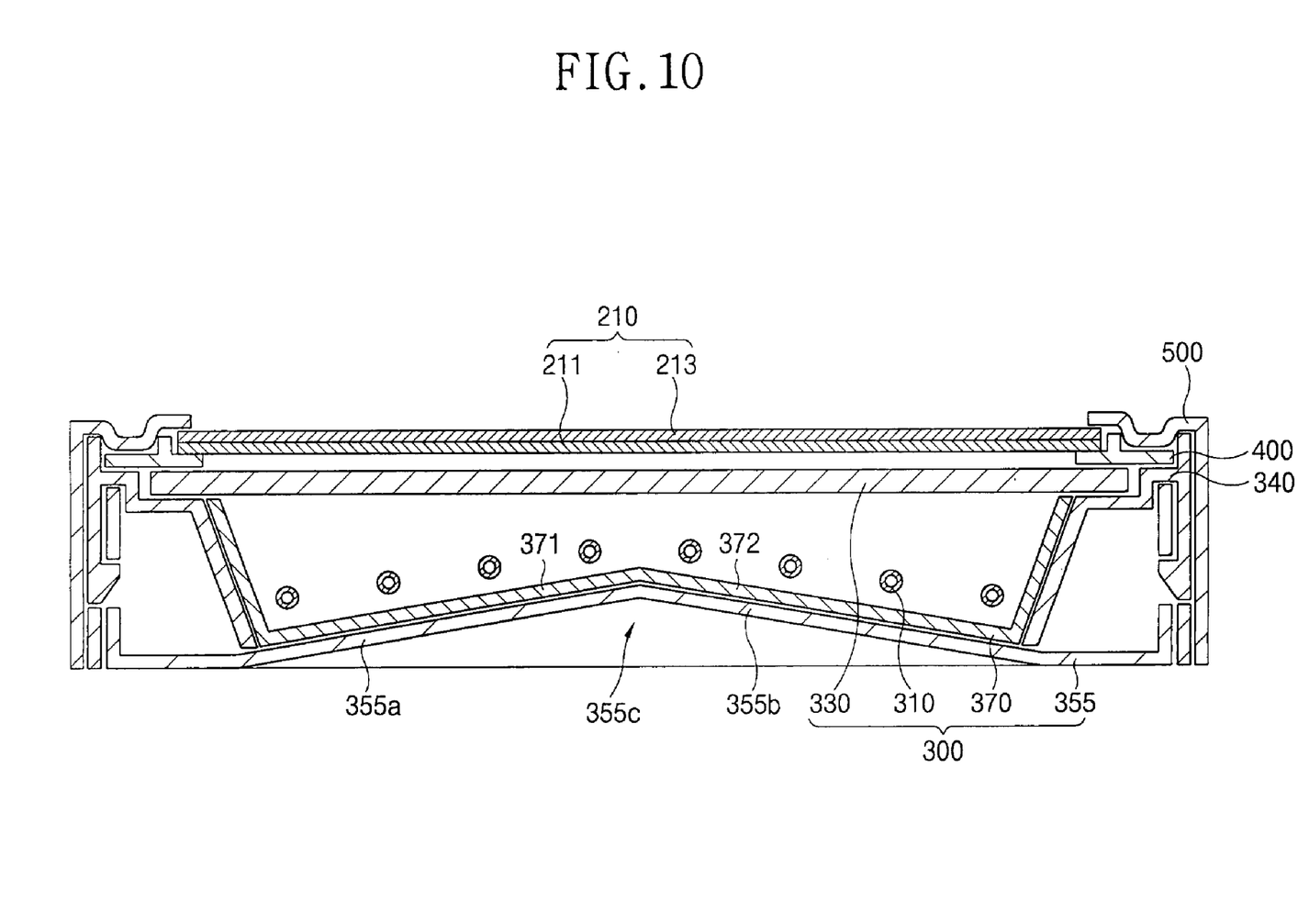
FIG. 10 is a cross-sectional view showing a structure of a bottom chassis according to another embodiment of the present invention, assembled to the direct lighting type LCD apparatus shown in FIG. 9.

FIG. 9 is a cross-sectional view showing a structure of a direct lighting type LCD apparatus according to another embodiment of the present invention. FIG. 10 is a cross-sectional view showing a structure of a bottom chassis according to another embodiment of the present invention to be employed in the direct lighting type LCD apparatus shown in FIG. 9.

Referring to FIG. 9, the direct lighting LCD apparatus 1300 includes an LCD panel 210 for displaying images and a backlight assembly 300 for supplying light to the LCD panel 210.

The backlight assembly 300 includes a plurality of lamps 310 for generating a first light, a diffusing plate 330 for diffusing the first light and light reflected from a lamp reflecting plate 370 to emit a second light, and a receiving member. The lamps 310 and the diffusing plate 330 are received in the receiving member. The receiving member also includes the lamp reflecting plate 370, a bottom mold frame 340 and a bottom chassis 350.

In FIG. 9, the direct lighting type LCD apparatus has eight lamps as an exemplary embodiment, however the number of lamps may vary in different embodiments.

The lamp reflecting plate 370 is provided with plural inclination surfaces inclined toward a central portion of the diffusing plate 330, so that the closer to the central portion of the lamp reflecting plate 370 a lamp is placed, the shorter is a distance between the lamp and the diffusing plate 330.

The lamp reflecting plate 370 includes a first inclination surface 371 inclined at a first angle α1 with respect to the diffusing plate 330, a second inclination surface 372 inclined at a second angle α2 with respect to the diffusing plate 330 and in contact with the first inclination surface 371, a third inclination surface 373 extended from the first inclination surface 371 and inclined at a third angle α3 with respect to the first inclination surface 371, and a fourth inclination surface 374 extended from the second inclination surface 372 and inclined at a fourth angle α4 with respect to the second inclination surface 372. A pitch 375 is formed with the first inclination surface 371 and the second inclination surface 372 at the central portion of the diffusing plate 330.

As shown in FIG. 9, the first inclination surface 371 is inclined at the first angle α1 with respect to an imaginary line parallel to the diffusing plate 330, and the second inclination surface 372 is inclined at the second angle α2 with respect to the imaginary line. For example, the first and second angles α1 and α2 may be more than 0 degree and less than 90 degrees, and the third and fourth angles α3 and α4 are substantially identical to each other or the same.

The first and second angles α1 and α2 may be different from each other. In this case, the pitch 375 in that the first inclination surface 371 comes in contact with the second inclination surface 372 is located apart from the central portion of the diffusing plate 330.

The lamps 310 are disposed proximately on the first and second inclination surfaces 371 and 372. Of the lamps 310, those disposed at the central portion of the diffusing plate 330 are referred as first lamps 311, and those disposed at the end portions of the lamp reflecting plate 370 are referred as second lamps 312. A vertical distance d4 between each first lamp 311 and the diffusing plate 330 is smaller than a vertical distance d2 between each second lamp 312 and the diffusing plate 330. That is, the irradiation distance of the light from the first lamps 311 is shorter than that of the light from the second lamps 312. Thus, the amount of the light supplied to the central portion of the diffusing plate 330 increases. Accordingly, the direct lighting type LCD apparatus 1200 may increase brightness at the central portion of the LCD panel 210.

Although not shown in FIG. 9, the bottom mold frame 340 further includes fixing portions (not shown) disposed on sidewalls facing the opposite end portions of the lamps 310. The fixing portions are separated from each other, and each of which is corresponding to the respective lamps 310. The fixing portions are coupled to the opposite end portions of the lamps 310 to fix the lamps 310 to the bottom mold frame 340, respectively.

As shown in FIG. 10, the bottom chassis 355 may have a bottom surface corresponding to the bottom surface of the lamp reflecting plate 370. Particularly, the bottom chassis 355 includes a bottom surface on which the lamp reflecting plate 370 is disposed and sidewalls extended from the bottom surface thereof. The bottom surface of the bottom chassis 355 includes a fifth inclination surface 355a parallel to the first inclination surface 371 and a sixth inclination surface 355b parallel to the second inclination surface 372.

When employing the bottom chassis 355, a receiving space 355c is provided under the bottom surface of the bottom chassis 355. Although not shown in FIG. 10, parts such as a PCB, a power line and the like of the direct lighting type LCD apparatus 1200 may be received in the receiving space 355c. Accordingly, the entire size of the direct lighting type LCD apparatus 1300 is reduced.

Figure 11:
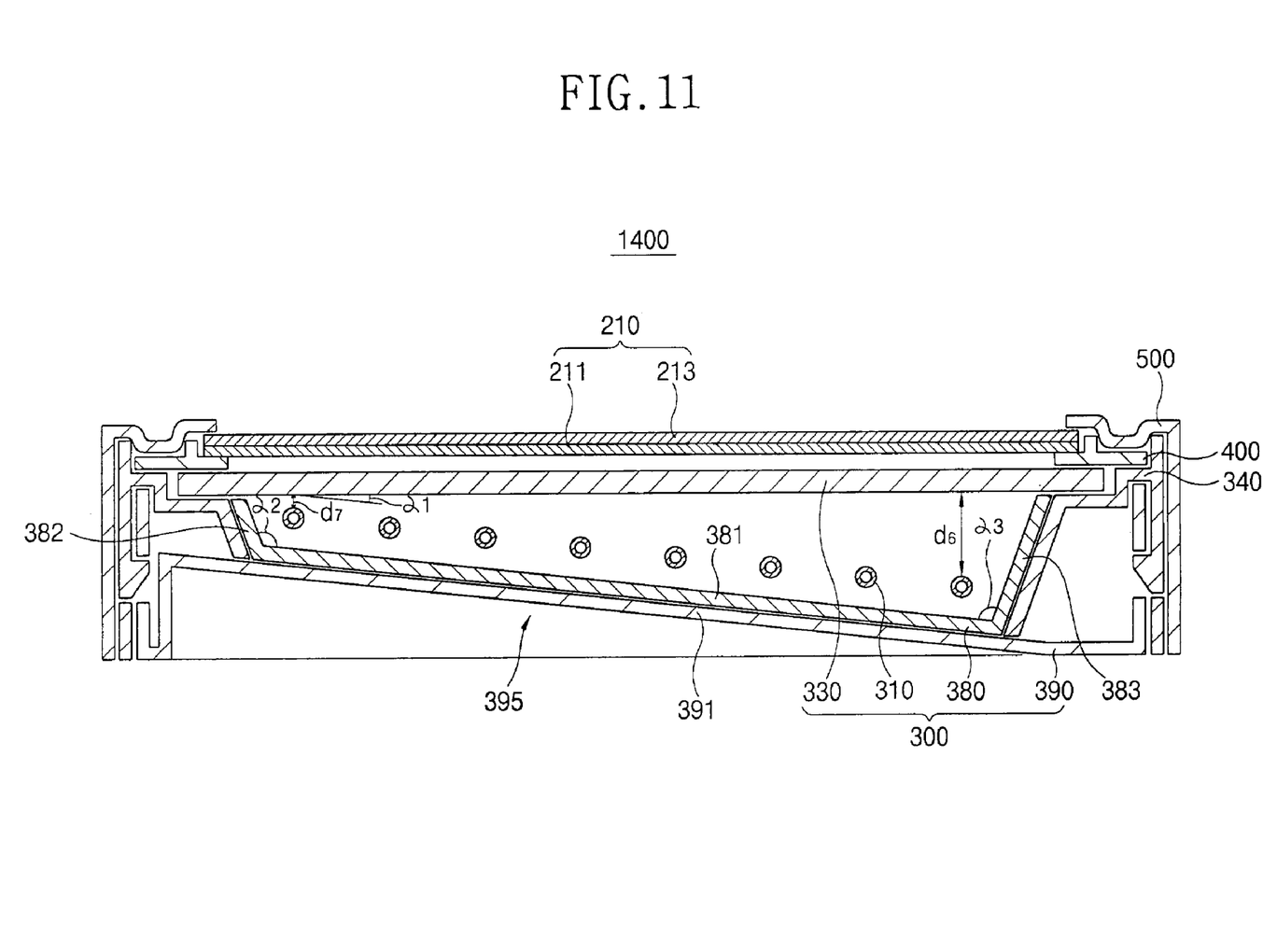
FIG. 11 is a cross-sectional view showing a structure of a direct lighting type LCD apparatus according to another embodiment of the present invention.

FIG. 11 is a cross-sectional view showing a structure of a direct lighting type LCD apparatus according to another embodiment of the present invention.

Referring to FIG. 11, the direct lighting LCD apparatus 1400 includes an LCD panel 210 for displaying images and a backlight assembly 300 for supplying light to the LCD panel 210.

The backlight assembly 300 includes a plurality of lamps 310 for generating a first light, a diffusing plate 330 for diffusing the first light and light reflected from a lamp reflecting plate 380 to emit a second light, and a receiving member. The lamps 310 and the diffusing plate 330 are received in the receiving member. The receiving member also includes the lamp reflecting plate 380, a bottom mold frame 340 and a bottom chassis 390.

In FIG. 11, the direct lighting type LCD apparatus has eight lamps as an exemplary embodiment, however the number of lamps may vary in different embodiments.

The lamp reflecting plate 380 is provided with an inclination surface inclined from one end portion of the diffusing plate 330 toward the opposite end portion of the diffusing plate 330. The lamp reflecting plate 380 reflects the first light from the lamps 310 to the diffusing plate 330.

The lamp reflecting plate 380 includes a first inclination surface 381 inclined at a first angle $\alpha 1$ with respect to the diffusing plate 330, a second inclination surface 382 extended from a first end portion of the first inclination surface 381 and inclined at a second angle $\alpha 2$ with respect to the first inclination surface 381, and a third inclination surface 383 extended from a second end portion of the first inclination surface 381 and inclined at a third angle $\alpha 3$ with respect to the first inclination surface 381.

For example, the first angle $\alpha 1$ is more than 0 degree and less than 90 degrees, the second angle $\alpha 2$ is more than 0 degree and less than 180 degrees, and the third angle $\alpha 3$ is more than 0 degree and less than 180 degrees.

The lamps 310 are disposed proximately on the first inclination surface 381. Distances between the respective lamps 310 and the first inclination surface 381 are substantially identical to each other. Accordingly, distances between the respective lamps 310 and the diffusing plate 330 vary such that a distance between a lamp and the diffusing plate 330 is relatively longer as the lamp is located closer to the second end portion of the lamp reflecting plate 380, so that the amount of the light supplied from the lamps 310 to the diffusing plate 330 gradually increases from a relatively lower amount at the second end portion of the diffusing plate 330 to a relative higher amount at the first end portion of the diffusing plate 330.

Although not shown in FIG. 11, the bottom mold frame 340 further includes fixing portions (not shown) disposed on sidewalls facing the opposite end portions of the respective lamps 310. The fixing portions are separated from each other and each of which is corresponding to the respective lamps 310. That is, distances between the respective fixing portions and the diffusing plate 330 vary such that a distance between a fixing portion and the diffusing plate 330 is relatively longer as the fixing portion is located closer to the second end portion of the lamp reflecting plate 380. The fixing portions are coupled to the opposite end portions of the lamps 310 to fix the lamps 310 to the bottom mold frame 340, respectively.

As shown in FIG. 11, the bottom chassis 390 may have a bottom surface corresponding to the bottom surface of the lamp reflecting plate 380. Particularly, the bottom chassis 390 includes a bottom surface on which the lamp reflecting plate 380 is disposed and sidewalls extended from the bottom surface thereof. The bottom surface of the bottom chassis 390 includes a fourth inclination surface 391 parallel to the first inclination surface 381.

When employing the bottom chassis 390, a receiving space 395 is provided under the bottom surface of the bottom chassis 390. Although not shown in FIG. 11, parts such as a PCB, a power line and the like of the direct lighting type LCD apparatus 1300 may be received in the receiving space 395. Accordingly, the entire size of the direct lighting type LCD apparatus 1300 is reduced.

According to the backlight assembly and the direct lighting type LCD apparatus of the present invention, a lamp reflecting plate includes a bottom surface and sidewalls, which are inclined at various angles, respectively, with respect to a diffusing plate, and lamps are disposed on the bottom surface of the lamp reflecting plate. Thus, distances between the respective lamps and the diffusing plate are different from each other according to positions of the lamps disposed on the lamp reflecting plate.

Accordingly, the direct lighting type LCD apparatus provides brightness distribution, which is uniform over the entire screen thereof. Also, the brightness distribution may be partially controlled by adjusting the distances between the respective lamps and the diffusing plate. Therefore, the direct lighting type LCD apparatus may prevent display quality of images from being deteriorated.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a plurality of lamps that generate light;
   a diffusing member that diffuses the light from the lamps; and
   a receiving member that receives the lamps and the diffusing member, the receiving member comprising a lamp reflecting plate disposed under the lamps, the lamp reflecting plate reflecting the light to the diffusing member,
   wherein the lamps comprise first lamps disposed at both end portions of the receiving member and at least one second lamp intermediating the first lamps, and the first lamps are closer to the diffusing member than the at least one second lamp,
   wherein the reflecting plate comprises a flat portion parallel to the diffusing member, a first inclination portion extended from an end portion of the flat portion, and a second inclination portion extended from an end portion of the first inclination portion.

2. The backlight assembly of claim 1, wherein the receiving member further comprises:
   a bottom chassis having a bottom surface and sidewalk extended from the bottom surface, the bottom chassis receiving the lamp reflecting plate and the lamps; and
   a mold frame combined to the bottom chassis and coupled to end portions of the respective lamps to fix the lamps to the mold frame, the mold frame receiving the diffusing member.

3. The backlight assembly of claim 2, wherein the
   first inclination portion is inclined at a first angle with respect to the flat portion, and
   the second inclination portion is inclined at a second angle smaller than the first angle with respect to the flat portion.

4. The backlight assembly of claim 3, wherein the lamps are disposed proximate the flat portion and the first inclination portion.

5. The backlight assembly of claim 4, wherein the first lamps are disposed proximate the first inclination portion, and the second lamp is disposed proximate the flat portion.

6. The backlight assembly of claim 2, wherein the lamp reflecting plate comprises:
   a first flat portion parallel to the diffusing member;
   a first inclination portion extended from an end portion of the first flat portion and inclined at a first angle with respect to the first flat portion;

a second flat portion extended from the first inclination portion; and a second inclination portion extended from the second flat portion and inclined at a second angle with respect to the second flat portion.

7. The backlight assembly of claim 6, wherein the lamps are disposed proximate the first and second flat portions.

8. The backlight assembly of claim 7, wherein a distance between a lamp disposed proximate the first flat portion and the diffusing member is greater than a distance between a lamp disposed proximate the second flat portion and the diffusing member.

9. The backlight assembly of claim 2, wherein the lamp reflecting plate comprises:

a first inclination portion inclined, at a first angle with respect to the diffusing member, from a first position at an end portion of the diffusing member toward a second position at the other end portion of the diffusing member;

a second inclination portion extended from a first edge of the first inclination portion and inclined at a second angle with respect to the first inclination portion; and a third inclination portion extended from a second edge opposite to the first edge of the first inclination portion and inclined at a third angel with respect to the first inclination portion.

10. The backlight assembly of claim 1, wherein distances between the respective lamps and the diffusing member vary in association with positions of the respective lamps such that the closer to a central portion of the diffusing member a lamp is placed, the shorter is a distance between the lamp and the diffusing member.

11. The backlight assembly of claim 10, wherein the receiving member comprises:

a lamp reflecting plate disposed under the lamps for reflecting the first light to the diffusing member;

a bottom chassis having a bottom surface and sidewalls extended from the bottom surface for receiving the lamp reflecting plate and the lamps; and a mold frame combined to the bottom chassis and coupled to end portions of the respective lamps to fix the lamps to the mold frame, the mold frame receiving the diffusing member.

12. The backlight assembly of claim 11, wherein the lamp reflecting plate comprises:

a first inclination portion inclined, at a first angle with respect to the diffusing member, from a first position at an end portion of the diffusing member toward a second position at the central portion of the diffusing member;

a second inclination portion inclined, at a second angle with respect to the diffusing member, from a third position at the other end portion of the diffusing member toward the second position at the central portion of the diffusing member, the second inclination portion being in contact with the first inclination portion at the second position;

a third inclination portion extended from the second inclination portion and inclined at a third angle with respect to the second inclination portion; and a fourth inclination portion extended from the first inclination portion and inclined at a fourth angle with respect to the first inclination portion.

13. The backlight assembly of claim 12, wherein the first and second inclination portions are protruded toward the diffusing member at the central portion of the diffusing member to form a pitch at the central portion of the diffusing member.

14. The backlight assembly of claim 13, wherein the lamps are disposed proximate the first and second inclination portions.

15. The backlight assembly of claim 13, wherein the first and second angles are substantially identical to each other.

16. The backlight assembly of claim 13, wherein the bottom surface of the bottom chassis has a shape corresponding to a bottom surface shape of the lamp reflecting plate.

17. The backlight assembly of claim 1, wherein a distance between each of the first lamps and the lamp reflecting plate is substantially some as a distance between the at least one second lamp and the lamp reflecting plate.

18. A backlight assembly comprising:

a plurality of lamps that generate light; and a receiving member including a bottom surface and a plurality of side walls, the receiving member receiving the lamps, the receiving member comprising a lamp reflecting plate disposed under the lamps, the lamp reflecting plate reflecting the light, wherein the lamps include first lamps disposed adjacent to the side walls, and a second lamp disposed at a, central portion of the bottom surface, wherein the second lamp is disposed more proximate the bottom surface than the first lamps are disposed, wherein the lamp reflecting plate comprises a flat portion parallel to a diffusing member diffusing light from the plurality of lamps, a first inclination portion extended from an end portion of the flat portion, and a second inclination portion extended form an end portion of the first inclination portion.

19. The backlight assembly of claim 18, wherein a distance between each of the first lamps and the lamp reflecting plate is substantially same as a distance between the second lamp and the lamp reflecting plate.

* * * * *